US011735757B2

United States Patent
Okazaki et al.

(10) Patent No.: US 11,735,757 B2
(45) Date of Patent: Aug. 22, 2023

(54) FUEL CELL SYSTEM

(71) Applicant: HITACHI ZOSEN CORPORATION, Osaka (JP)

(72) Inventors: Yasuhide Okazaki, Osaka (JP); Yoshinobu Takaki, Osaka (JP); Kotaro Yagi, Osaka (JP); Masato Kawami, Osaka (JP); Takashi Ogawa, Osaka (JP); Naohiro Nakataya, Osaka (JP); Masao Oku, Osaka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 33 days.

(21) Appl. No.: 17/625,581

(22) PCT Filed: Jun. 15, 2020

(86) PCT No.: PCT/JP2020/023396
§ 371 (c)(1),
(2) Date: Jan. 7, 2022

(87) PCT Pub. No.: WO2021/005973
PCT Pub. Date: Jan. 14, 2021

(65) Prior Publication Data
US 2022/0293992 A1 Sep. 15, 2022

(30) Foreign Application Priority Data

Jul. 10, 2019 (JP) ................................ 2019-128235

(51) Int. Cl.
*H01M 8/243* (2016.01)
*H01M 8/2484* (2016.01)
(Continued)

(52) U.S. Cl.
CPC ......... *H01M 8/243* (2013.01); *H01M 8/0618* (2013.01); *H01M 8/0662* (2013.01);
(Continued)

(58) Field of Classification Search
CPC .. H01M 8/243; H01M 8/2484; H01M 8/0618; H01M 8/0662; H01M 8/2475; H01M 2008/1293
See application file for complete search history.

(56) References Cited

U.S. PATENT DOCUMENTS

| 5,298,341 | A | 3/1994 | Khandkar et al. |
| 5,914,200 | A | 6/1999 | Schabert et al. |

(Continued)

FOREIGN PATENT DOCUMENTS

| JP | 6-196197 A | 7/1994 |
| JP | 8-506691 A | 7/1996 |

(Continued)

OTHER PUBLICATIONS

International Preliminary Report on Patentability dated Jan. 11, 2022, issued in corresponding International Application No. PCT/JP2020/023396 with English translation (10 pgs).

(Continued)

*Primary Examiner* — Matthew J Merkling
(74) *Attorney, Agent, or Firm* — Pillsbury Winthrop Shaw Pittman, LLP

(57) ABSTRACT

A fuel cell system includes a reformer, fuel cell stacks, and an exhaust-gas combustor. The reformer has a tubular shape extending in an axial direction and reforms raw fuel into combustion gas. The fuel cell stacks generate electric power from the fuel gas and oxidant gas. The fuel cell stacks are arranged radially outward of the reformer in a circumferential direction to face the reformer in a radial direction. The exhaust-gas combustor burns fuel gas that is not used and included in exhaust gas from the fuel cell stacks. The exhaust-gas combustor is arranged radially inward of the reformer to face the reformer in the radial direction. Each fuel cell stack includes flat plate type cells stacked in the (Continued)

radial direction. This achieves downsizing of the fuel cell system.

10 Claims, 6 Drawing Sheets

(51) Int. Cl.
    *H01M 8/0612* (2016.01)
    *H01M 8/0662* (2016.01)
    *H01M 8/2475* (2016.01)
    *H01M 8/12* (2016.01)

(52) U.S. Cl.
    CPC ....... *H01M 8/2475* (2013.01); *H01M 8/2484* (2016.02); *H01M 2008/1293* (2013.01)

(56) References Cited

U.S. PATENT DOCUMENTS

| | | | |
|---|---|---|---|
| 2007/0196704 A1* | 8/2007 | Valensa | H01M 8/0618 429/495 |
| 2009/0136813 A1* | 5/2009 | Hirata | H01M 8/04007 429/465 |
| 2009/0233130 A1* | 9/2009 | Hirata | H01M 8/0618 429/425 |
| 2011/0281185 A1 | 11/2011 | Sridhar et al. | |
| 2012/0196194 A1 | 8/2012 | Perry et al. | |
| 2015/0118123 A1 | 4/2015 | Verykios et al. | |
| 2016/0111749 A1 | 4/2016 | Wang et al. | |
| 2022/0246954 A1* | 8/2022 | Hayasaka | H01M 8/243 |

FOREIGN PATENT DOCUMENTS

| | | |
|---|---|---|
| JP | 2009-524208 A | 6/2009 |
| JP | 2015-517175 A | 6/2015 |
| JP | 2016-520976 A | 7/2016 |
| JP | 6138356 B2 | 5/2017 |
| JP | 6258037 B2 | 12/2017 |

OTHER PUBLICATIONS

International Search Report dated Sep. 8, 2020, issued in corresponding International Patent Application No. PCT/JP2020/023396 with English translation (5 pgs.).

* cited by examiner

FUEL CELL SYSTEM

TECHNICAL FIELD

The present invention relates to a fuel cell system.

CROSS-REFERENCE TO RELATED APPLICATION

This application is a U.S. National Phase Application of International Application No. PCT/JP2020/023396, filed Jun. 15, 2020, which claims priority benefit of Japanese Patent Application No. JP2019-128235, filed in the Japan Patent Office on Jul. 10, 2019, the entire disclosure of each of which is incorporated herein by reference.

BACKGROUND ART

Various fuel cell systems for generating electric power by using fuel cells have conventionally been proposed. For example, in a solid oxide fuel cell system disclosed in Japanese Unexamined Patent Application Publication (Translation of PCT Application) H8-506691 (Document 1), a plurality of cell stacks arranged in a loop is housed in a vessel, and a reformer for generating fuel gas is arranged outside the vessel. In a high-temperature fuel cell device disclosed in Japanese Patent Application Laid-Open No. 6258037 (Document 2), a plurality of high-temperature fuel cell stacks are arranged in a cylinder, and a reformer is arranged in a space located radially inward of the high-temperature fuel cell stacks. Out of fuel gas generated by the reformer, fuel gas that has not been consumed by the high-temperature fuel cell stacks (i.e., anode exhaust gas) is discharged to the outside of the high-temperature fuel cell device and burnt. In a solid oxide fuel cell power generation system disclosed in Japanese Patent Application Laid-Open No. 6138356 (Document 3), a plurality of single stacks and a plurality of reformers are alternately arranged in a loop.

In Document 1, a heater for heating the reformer outside the vessel is necessary because the generation of fuel gas by the reformer is equivalent to an endothermic reaction. In Document 2, the reformer is heated by exhaust heat from the high-temperature fuel cell stacks, but the use of exhaust heat in the high-temperature fuel cell device is insufficient. The same can be said of Document 3. In the solid oxide fuel cell power generation system according to Document 3, the increased number of reformers and a resultant increase in the number of connecting tubes complicate the structure of the power generation system and may result in upsizing of the power generation system.

SUMMARY OF INVENTION

The present invention has been made in light of the problems described above, and it is an object of the present invention to achieve downsizing of a fuel cell system.

The present invention is intended for a fuel cell system. A fuel cell system according to one preferable embodiment of the present invention includes a reformer that has a tubular shape extending in an axial direction and reforms raw fuel into fuel gas, a plurality of cell stacks that are arranged radially outward of the reformer in a circumferential direction to face the reformer in a radial direction and generate electric power from the fuel gas and oxidant gas, and an exhaust-gas combustor that is arranged radially inward of the reformer to face the reformer in the radial direction and burns the fuel gas that is not used and included in exhaust gas from the plurality of cell stacks. Each of the plurality of cell stacks includes a plurality of flat plate type cells stacked in the radial direction.

This configuration of the fuel cell system permits downsizing of the fuel cell system.

Preferably, the exhaust-gas combustor faces a portion of the reformer in the radial direction, the portion being located close to a supply port from which the raw fuel is supplied.

Preferably, the plurality of cell stacks include a plurality of rows of cell stack groups arranged in three or more rows in the axial direction, and a cell stack group in at least one row of the plurality of rows of cell stack groups, excluding cell stack groups at both ends in the axial direction, faces a portion of the reformer in the radial direction, the portion being located close to a supply port from which the raw fuel is supplied.

Preferably, the fuel cell system further includes a combustion gas passage that passes combustion gas discharged from the exhaust-gas combustor through an interior of the reformer.

Preferably, the combustion gas passage has a U shape extending in the axial direction in the reformer.

Preferably, a flow direction of the combustion gas in the combustion gas passage is opposite to a flow direction of gas in the reformer.

Preferably, the fuel cell system further includes a pressure vessel that houses the reformer, the plurality of cell stacks, and the exhaust-gas combustor in an enclosed internal space. Each of the plurality of cell stacks has a cathode exhaust port from which cathode exhaust gas is discharged to the internal space of the pressure vessel.

Preferably, the fuel cell system further includes a pressure vessel that houses the reformer, the plurality of cell stacks, and the exhaust-gas combustor in an enclosed internal space, and an oxidant gas passage that is arranged around the pressure vessel to face the pressure vessel and passes the oxidant gas supplied to the plurality of cell stacks.

Preferably, the fuel cell system further includes an exhaust gas passage that is arranged adjacent to the oxidant gas passage and passes cathode exhaust gas discharged from the pressure vessel or combustion gas discharged from the exhaust-gas combustor.

Preferably, each of the plurality of cell stacks is a solid oxide fuel cell.

These and other objects, features, aspects and advantages of the present invention will become more apparent from the following detailed description of the present invention when taken in conjunction with the accompanying drawings.

DESCRIPTION OF EMBODIMENTS

Figure 1:
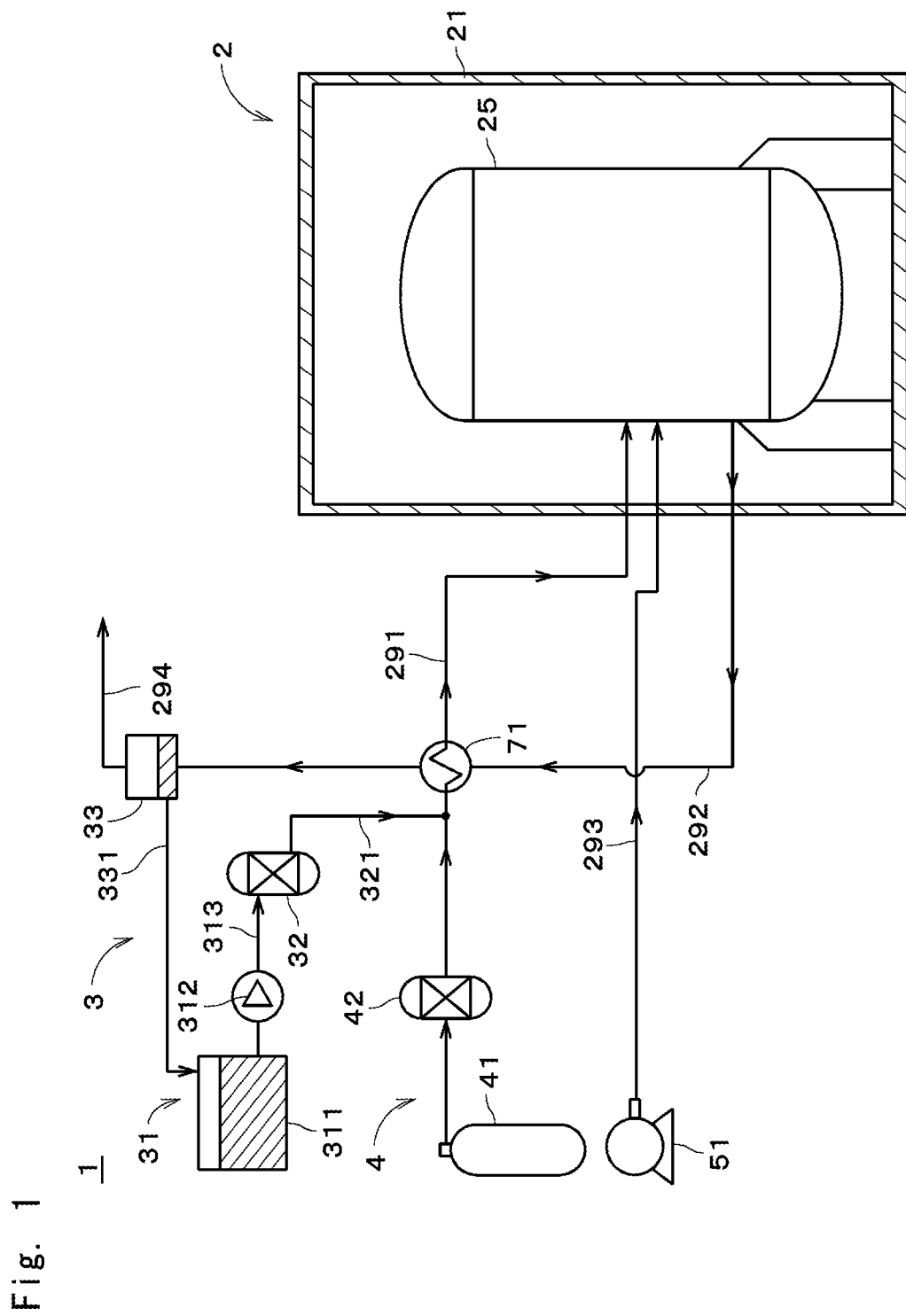
FIG. 1 is a diagram illustrating a configuration of a fuel cell system according to one embodiment.

FIG. 1 is a diagram illustrating a configuration of a fuel cell system 1 according to one embodiment of the present invention. The fuel cell system 1 is a power generation system that generates electric power by using fuel cells. The fuel cell system 1 includes a hot module 2, a raw-fuel supplier 4, and a blower 51.

Figure 2:
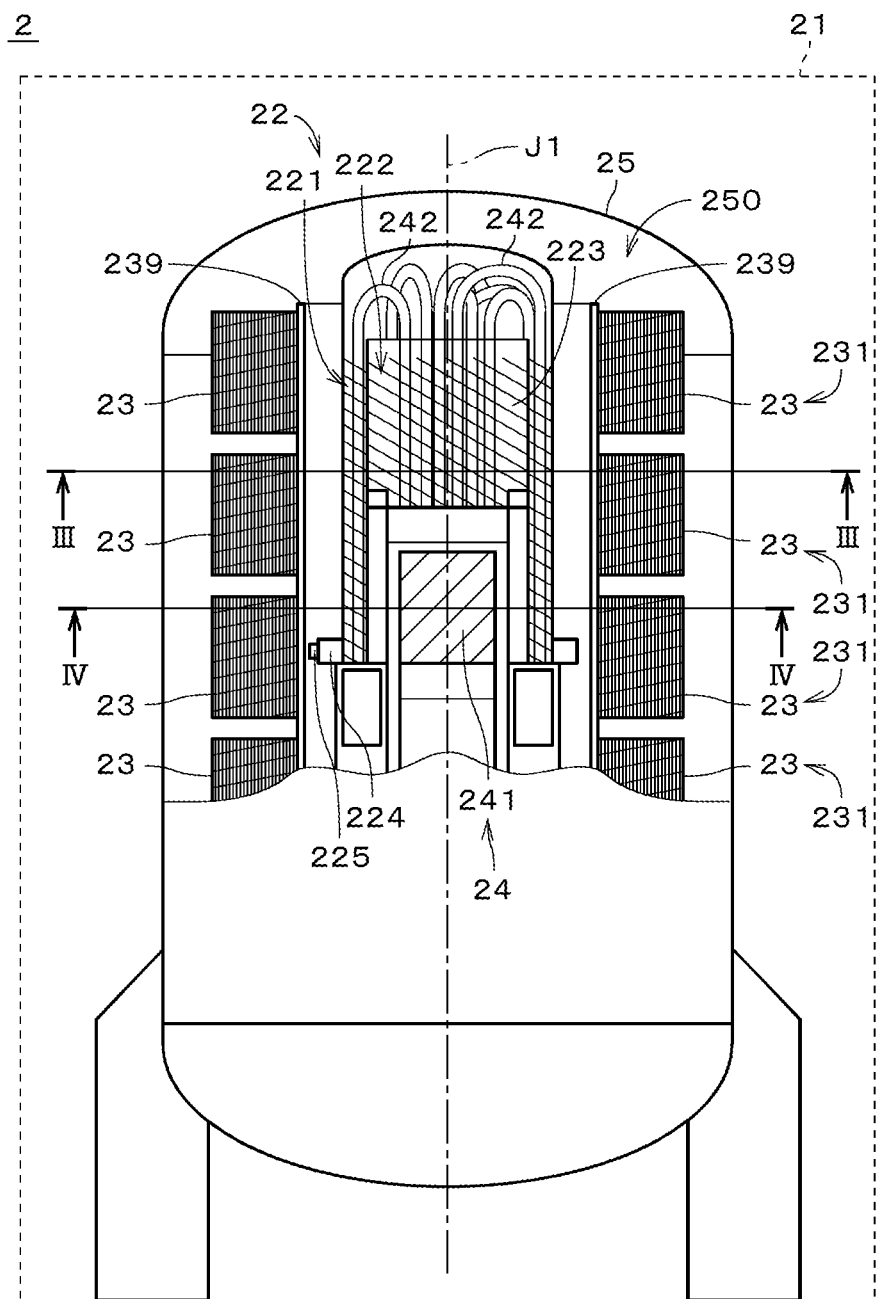
FIG. 2 is a longitudinal sectional view of a hot module.
Figure 3:
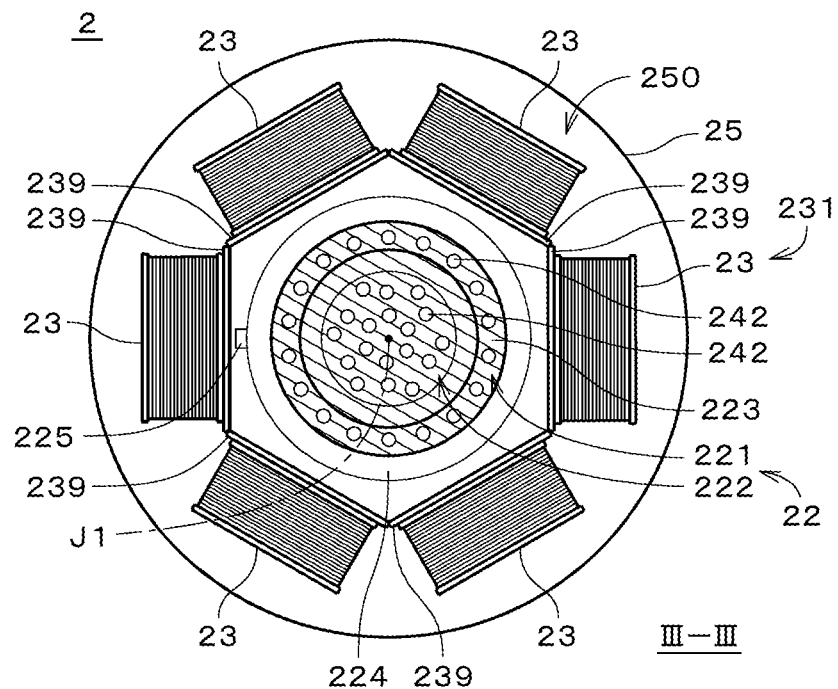
FIG. 3 is a cross-sectional view of the hot module.
Figure 4:
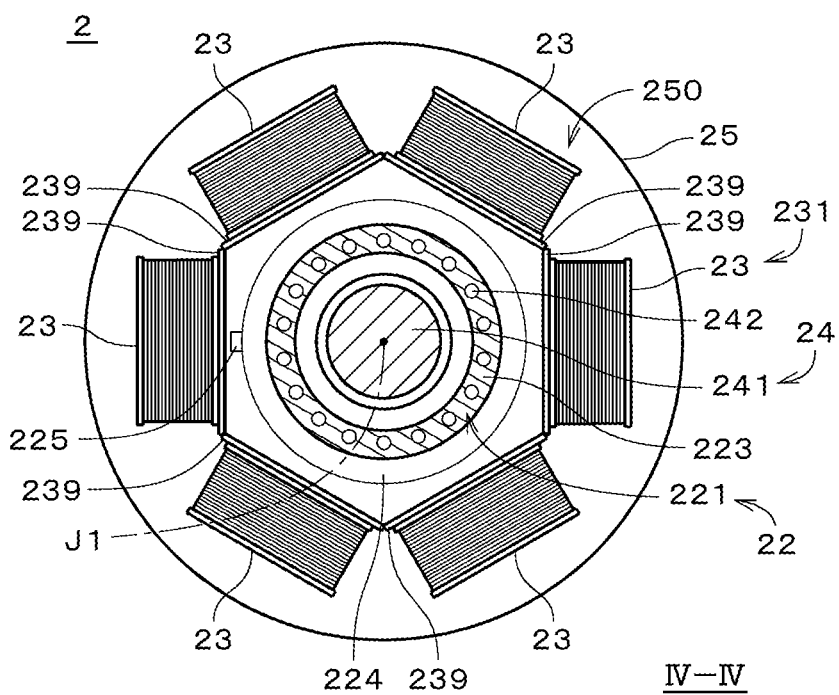
FIG. 4 is a cross-sectional view of the hot module.

FIG. 2 is a longitudinal sectional view of the hot module 2. FIGS. 3 and 4 are cross-sectional views of the hot module 2 taken at positions and Iv-Iv, respectively, in FIG. 2. The hot module 2 includes a housing 21, a reformer 22, a plurality of cell stacks 23, an exhaust-gas combustor 24, and a pressure vessel 25. In FIG. 2, part of the configuration is illustrated as viewed from a side. The housing 21 is illustrated by a dashed line in FIG. 2, but not shown in FIGS. 3 and 4.

The pressure vessel 25 may, for example, be a hollow vessel formed of metal such as stainless steel. For example, the pressure vessel 25 may be an approximately cylindrical vessel having a central axis J1 as its center and a closed top and bottom. In the following description, the direction of extension of the central axis J1 is referred to as an "axial direction." In the example illustrated in FIG. 2, the axial direction is approximately parallel to the up-down direction. The reformer 22, the cell stacks 23, and the exhaust-gas combustor 24 are housed in an enclosed internal space 250 of the pressure vessel 25. Alternatively, a heat supplier (not shown) such as a burner that heats the reformer 22 and the cell stacks 23 during the startup operation of the fuel cell system 1 may also be housed in the pressure vessel 25.

When the fuel cell system 1 has an output of approximately 20 kW, the pressure vessel 25 has a diameter of 65 cm to 100 cm and a height of 100 cm to 200 cm, for example. When the fuel cell system 1 is installed at, for example, the rooftop of an office building, the pressure vessel 25 preferably has a size capable of being brought to the rooftop by an elevator or the like. The output of the fuel cell system 1, the size of the pressure vessel 25, or other factors may be modified in various ways.

The pressure vessel 25 is housed in an internal space of the housing 21. The housing 21 may, for example, be an approximately rectangular parallelepiped case. The housing 21 has an inner surface formed of a heat insulating material (e.g., rock wool) having relatively high heat insulating properties. For example, a metal vessel with its entire inner surface covered with a heat insulating material may be used as the housing 21.

The reformer 22 is arranged in a central portion of the pressure vessel 25 in a radial direction with its center on the central axis J1 (hereinafter, simply also referred to as the "radial direction"). The reformer 22 reforms raw fuel into reformed gas including fuel gas. The raw fuel may, for example, be hydrocarbon fuel. The raw fuel may be any of other variety of fuel other than hydrocarbon fuel. Examples of the raw fuel include LP gas, town gas, natural gas, lamp oil, biogas, and bioethanol. The reformer 22 reforms the raw fuel by, for example, steam reforming, partial oxidative reforming, or autothermal reforming process that is a combination of steam reforming and partial oxidative reforming. The reforming of the raw fuel by the reformer 22 as a whole is equivalent to an endothermic reaction.

The reformer 22 is an approximately tubular member extending in the axial direction with its center on the central axis J1. In the example illustrated in FIGS. 2 to 4, the reformer 22 includes a first reforming passage 221 and a second reforming passage 222. As indicated with hatching, a reformer catalyst 223 for use in reforming of the raw fuel is housed in the first reforming passage 221 and the second reforming passage 222. The first reforming passage 221 is an approximately cylindrical passage having the central axis J1 as its center. The second reforming passage 222 is arranged radially inward of the first reforming passage 221 and adjacent to the first reforming passage 221 in the radial direction. The second reforming passage 222 is an approximately columnar passage having the central axis J1 as its center. The second reforming passage 222 has a shorter axial length than the first reforming passage 221 and faces an upper portion of the first reforming passage 221 in the radial direction. Therefore, the reformer 22 has a lower portion of an approximately cylindrical shape and an upper portion of an approximately columnar shape.

A buffer passage 224 of an approximately annular ring shape with its center on the central axis J1 is provided at the lower end of the first reforming passage 221. The buffer passage 224 has a supply port 225. The supply port 225 is connected through a raw-fuel supply pipe 291 illustrated in FIG. 1 to the raw-fuel supplier 4 arranged outside the housing 21.

The raw-fuel supplier 4 supplies steam and the raw fuel to the reformer 22 (see FIG. 2). The raw-fuel supplier 4 includes a raw-fuel supply source 41, an impurity remover 42, and a steam supplier 3. The impurity remover 42 is arranged in the raw-fuel supply pipe 291 and removes impurities (e.g., sulfur impurities) from the raw fuel supplied from the raw-fuel supply source 41 to the reformer 22.

The steam supplier 3 includes a water supplier 31, a steam generator 32, and a condenser 33. The water supplier 31 supplies water to the steam generator 32. Specifically, the water supplier 31 includes a water storage 311, a pump 312, and a water supply pipe 313. The water storage 311 is a tank for storing water (e.g., deionized water). The water storage 311 is connected through the water supply pipe 313 to the steam generator 32. The pump 312 is provided in the water supply pipe 313 and supplies the water stored in the water storage 311 to the steam generator 32.

The condenser 33 condenses steam in exhaust gas into water and supplies the water to the steam generator 32 via the water supplier 31 during the steady operation of the fuel cell system 1. The aforementioned steady operation refers to an operational state of the fuel cell system 1 when steadily generating electric power at a predetermined output. The predetermined output is the rated output of the fuel cell system 1 or a constant output less than the rated output. The aforementioned startup operation refers to an operational state of the fuel cell system 1 from startup to the start of the steady operation (i.e., until the outputs of the cell stacks 23 reach steady-operation outputs and are stabilized).

The steam generator 32 is an evaporator that heats the water supplied from the water supplier 31 to generate steam. The steam generator 32 is connected through a steam supply pipe 321 to the raw-fuel supply pipe 291. The steam supply pipe 321 is connected to the raw-fuel supply pipe 291 on the upstream side of a heat exchanger 71 that is provided in the raw-fuel supply pipe 291 (specifically, between the heat exchanger 71 and the impurity remover 42). The steam from the steam generator 32 passes through the heat exchanger 71 together with the raw fuel that has passed through the impurity remover 42 and is supplied to the supply port 225 of the reformer 22 illustrated in FIGS. 2 to 4.

The cell stacks 23 are arranged radially outward of the reformer 22 in a circumferential direction with its center on the central axis J1 (hereinafter, simply also referred to as the "circumferential direction"). The cell stacks 23 face the reformer 22 in the radial direction. In the example illustrated in FIGS. 2 to 4, the fuel cell system 1 includes 24 cell stacks 23. These 24 cell stacks 23 are attached to the outer surfaces of six support plates 239 that are arranged in an approximately hexagonal tubular shape to surround the reformer 22.

Each support plate 239 has attached thereto four cell stacks 23 that are arranged at approximately regular intervals in the axial direction.

When six cell stacks 23 that are arranged at approximately the same axial position are collectively referred to as a "cell stack group 231," the cell stacks 23 include four rows of cell stack groups 231 arranged in the axial direction. In each cell stack group 231, six cell stacks 23 are arranged at approximately equiangular intervals in the circumferential direction. The number and arrangement of cell stacks 23 included in each cell stack group 231 may be modified in various ways. The number of rows of cell stack groups 231 may also be modified in various ways. It is preferable that the number of rows of cell stack groups 231 is three or more.

Each of the cell stacks 23 is a solid oxide fuel cell (SOFC) that includes a plurality of flat plate type cells (single cell) stacked in the radial direction. Each cell stack 23 has, for example, an approximately rectangular parallelepiped shape. Each cell stack 23 has a radial (i.e., horizontal) thickness smaller than its longitudinal and horizontal lengths. In other words, each cell stack 23 has such an approximately flat plate shape that the direction of the normal to its main surface is approximately parallel to the radial direction.

The fuel gas generated by the reformer 22 is supplied to the negative electrode (anode) of each cell stack 23. The positive electrode (cathode) of each cell stack 23 is connected through an oxidant-gas supply pipe 293 illustrated in FIG. 1 to the blower 51 arranged outside the housing 21. The blower 51 supplies air that contains oxygen serving as oxidant gas, to the positive electrode of each cell stack 23. That is, the blower 51 serves as an oxidant-gas supplier that supplies oxidant gas to the cell stacks 23.

Each cell stack 23 generates electric power by causing an electrochemical reaction using the oxidant gas from the blower 51 and the fuel gas from the reformer 22. In other words, each cell stack 23 generates electric power from the fuel gas and the oxidant gas. The electrochemical reaction caused by each cell stack 23 (i.e., the generation of electric power) is equivalent to an exothermic reaction. The generation of electric power by the cell stacks 23 is conducted at a high temperature of, for example, 600° C. to 1000° C. The aforementioned fuel gas may, for example, be hydrogen gas. The oxidant gas may, for example, be oxygen. The fuel gas may also be any of other variety of gas other than hydrogen gas, and the oxidant gas may also be any of other variety of gas other than oxygen. Exhaust gas from each cell stack 23 after the generation of electric power is guided to the exhaust-gas combustor 24 illustrated in FIGS. 2 to 4.

The exhaust-gas combustor 24 is arranged radially inward of the reformer 22. Specifically, the exhaust-gas combustor 24 is arranged radially inward of an approximately cylindrical lower portion of the reformer 22 to face the lower portion of the reformer 22 in the radial direction. For example, the exhaust-gas combustor 24 may be an approximately columnar part having the central axis J1 as its center. The exhaust-gas combustor 24 burns the exhaust gas from the cell stacks 23. As indicated with hatching, a combustion catalyst 241 for use in combustion of the exhaust gas is housed in the exhaust-gas combustor 24. In the exhaust-gas combustor 24, cathode exhaust gas and anode exhaust gas from the positive electrode and the negative electrode, respectively, of each cell stack 23 are burnt through the combustion catalyst 241. Accordingly, fuel gas that is not used and included in the anode exhaust gas (i.e., excess fuel gas that has not been consumed by the cell stacks 23 during generation of electric power; hereinafter also referred to as the "unused fuel gas") is burnt. The combustion of the exhaust gas by the exhaust-gas combustor 24 is equivalent to an exothermic reaction.

Exhaust gas that has undergone combustion and has been discharged from the exhaust-gas combustor 24 (hereinafter, also referred to as the "combustion gas") flows through the interior of the reformer 22 through a plurality of (e.g., 20) combustion gas passages 242 that are connected to the upper end of the exhaust-gas combustor 24. Specifically, each combustion gas passage 242 in the reformer 22 is a pipe line that extends from the upper end of the exhaust-gas combustor 24 in the axial direction (i.e., the upward direction) within the second reforming passage 222 of the reformer 22, turns back at approximately 180 degrees above the second reforming passage 222, and extends in the axial direction (i.e., the downward direction) within the first reforming passage 221. In other words, each combustion gas passage 242 is a pipe line of an approximately U shape extending in the axial direction within the reformer 22. In the first reforming passage 221, the combustion gas passages 242 are arranged at, for example, approximately equiangular intervals in the circumferential direction. The number of combustion gas passages 242 may be modified in various ways. For example, the number of combustion gas passages 242 may be one, or two or more.

Figure 5:
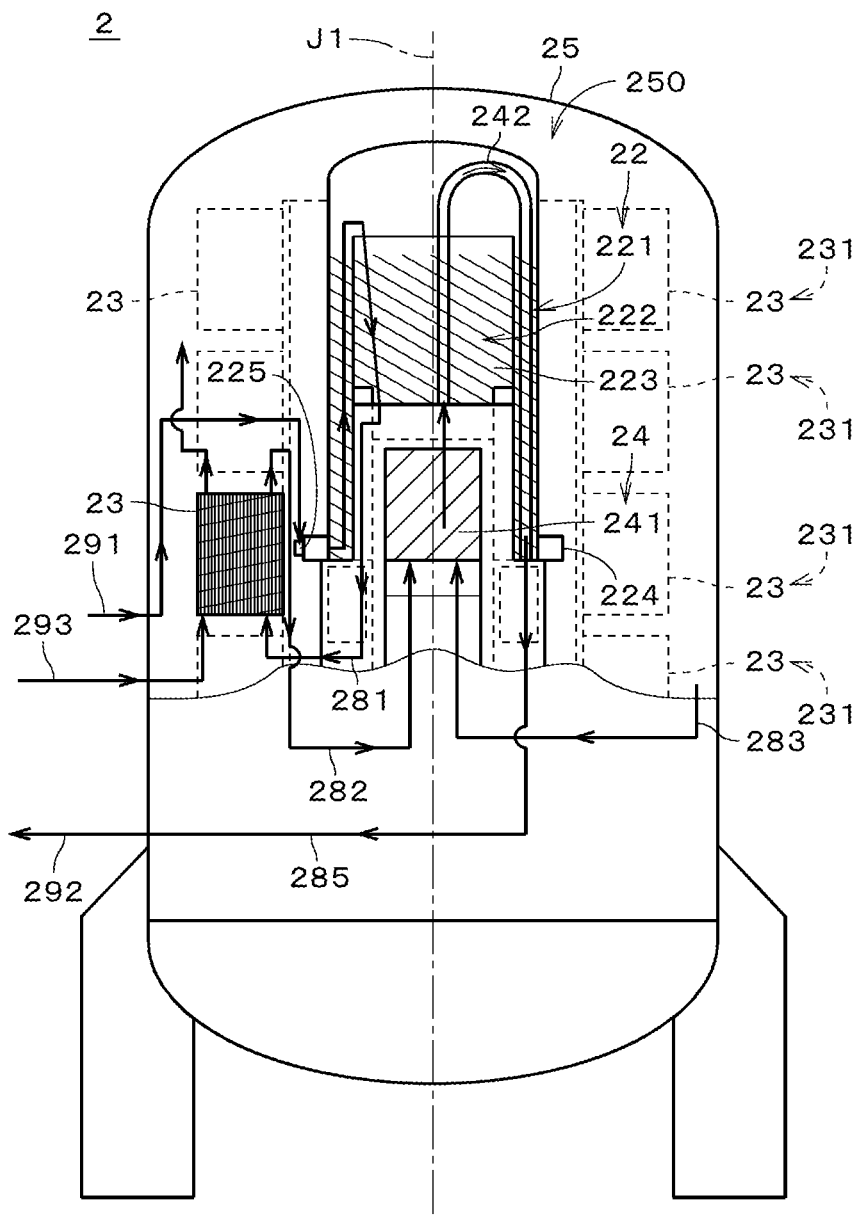
FIG. 5 is a longitudinal sectional view of another hot module.

Next, the details of the generation of electric power by the fuel cell system 1 will be described with reference to FIGS. 1 and 5. FIG. 5 is an explanatory diagram illustrating the flow of gas inside the pressure vessel 25. To facilitate understanding of the drawing, some constituent elements of the fuel cell system 1 are illustrated by broken lines and other some constituent elements are not shown in FIG. 5. In FIG. 5, the flow of gas only in one of the cell stacks 23 is indicated by arrows.

In the fuel cell system 1, the raw fuel (e.g., town gas) supplied from the raw-fuel supply source 41 and the steam supplied from the steam generator 32 are supplied through the raw-fuel supply pipe 291 and the supply port 225 to the buffer passage 224 of the reformer 22. The raw fuel and the steam spread approximately uniformly in the circumferential direction in the buffer passage 224 and flow upward in contact with the reformer catalyst 223 within the first reforming passage 221. In the first reforming passage 221, the raw fuel is reformed into reformed gas including hydrogen gas serving as the fuel gas at a high temperature by steam reforming using the steam.

The reformed gas that has passed through the first reforming passage 221 flows back in the downward direction above the first reforming passage 221 and flows downward in contact with the reformer catalyst 223 within the second reforming passage 222. In the second reforming passage 222, the raw fuel included in the reformed gas is reformed into fuel gas at a high temperature by steam reforming using the steam in the same manner as in the first reforming passage 221. The generation of the reformed gas in the first and second reforming passages 221 and 222 of the reformer 22 is equivalent to an endothermic reaction as described previously. The endothermic reaction occurs especially strongly in an area close to the supply port 225 at which the content of the raw fuel in the gas is high (e.g., a lower half portion of the first reforming passage 221). In other words, the portion of the reformer 22 that is located close to the supply port 225 absorbs a larger amount of heat than the other portion. The reformed gas that is sent out of the lower end of the second reforming passage 222 is supplied through a pipe 281 to the negative electrode of each cell stack 23.

On the other hand, the oxidant gas from the blower 51 (to be more precise, air that contains oxygen serving as the oxidant gas) is supplied through the oxidant-gas supply pipe 293 to the positive electrode of each cell stack 23 as described above. Each cell stack 23 generates electric power from the fuel gas supplied to its negative electrode and the oxidant gas supplied to its positive electrode as described above. The generation of electric power by the cell stacks 23 is equivalent to an exothermic reaction as described previously. The heat generated by the cell stacks 23 is applied to the reformer 22 that faces the cell stacks 23 in the radial direction and used in the reforming of the raw fuel, which is an endothermic reaction.

As described above, the cell stacks 23 include four rows of cell stack groups 231. Cell stack groups 231 that are located at both ends in the axial direction (i.e., the uppermost and lowermost rows of cell stack groups 231) have no cell stack group 231 located on their one side in the axial direction, and therefore can let heat escape to some extent more easily than the other cell stack groups 231. On the other hand, cell stack groups 231 other than those at both ends in the axial direction have difficulty in letting heat escape and tend to become high in temperature during generation of electric power, because they are located adjacent to other cell stack groups 231 on both sides in the axial direction.

In the example illustrated in FIG. 5, the portion of the reformer 22 that is located close to the supply port 225 and absorbs a large amount of heat (e.g., the lower half portion of the first reforming passage 221) faces two rows of cell stack groups 231 in the radial direction, the two rows of cell stack groups 231 being located in the center in the axial direction and having relatively high temperatures among the rows of cell stack groups 231. This improves the efficiency of the application of heat from the cell stacks 23 to the reformer 22. As a result, it is possible to improve the efficiency of the reforming of raw fuel by the reformer 22.

As the temperatures of the cell stacks 23 increases during generation of electric power, the cell stacks 23 improves the efficiency of generating electric power, but have shorter battery lives. When, as described above, the central cell stack groups 231 that become higher in temperature than the cell stack groups 231 on both sides in the axial direction are provided to face the portion of the reformer 23 that absorbs a large amount of heat, it is possible to reduce the temperatures of those cell stack groups 231 located in the center. This improves uniformity in the temperatures of the cell stacks 23 during generation of electric power and accordingly improves uniformity in the battery lives of the cell stacks 23. The cell stack groups 231 that face the portion of the reformer 22 located close to the supply port 225 are not necessarily limited to the two rows of cell stack groups 231 that are located in the center, and may be a cell stack group in at least one of the rows of cell stack groups 231, excluding the cell stack groups 23 on both sides in the axial direction.

Each cell stack 23 includes the positive electrode provided with a cathode exhaust port (not shown) that opens to the internal space 250 of the pressure vessel 25. Gas (i.e., cathode exhaust gas) that is directly discharged from the positive electrode of each cell stack 23 to the internal space 250 of the pressure vessel 25 through the cathode exhaust port diffuse approximately through the entire internal space 250. This makes the pressure in the internal space 250 of the pressure vessel 25 approximately the same as the pressure inside the cell stacks 23. Accordingly, it is possible to suppress leakage of gas from the insides of the cell stacks 23 (e.g., oxidant gas that is supplied to the positive electrode and immediately before reaching the cathode exhaust port). It is also possible to suppress leakage of gas from joints, such as joints between the cell stacks 23 and the pipes or joints between pipes in the pressure vessel 25. The cathode exhaust gas that has diffused to the internal space 250 of the pressure vessel 25 is supplied to the lower end of the exhaust-gas combustor 24 through a pipe 283 with its one end open to the internal space 250.

In each cell stack 23, the gas discharged from the negative electrode (i.e., anode exhaust gas) is supplied through a pipe 282 to the lower end of the exhaust-gas combustor 24. The anode exhaust gas includes steam generated from hydrogen gas serving as the fuel gas during generation of electric power by the cell stack 23, and the aforementioned unused fuel gas that has not been used for the generation of electric power by the cell stack 23.

In the exhaust-gas combustor 24, the cathode exhaust gas and the anode exhaust gas that are supplied respectively from the pipe 283 and the pipe 282 flow upward in contact with the combustion catalyst 241 within the exhaust-gas combustor 24. In the exhaust-gas combustor 24, the unused fuel gas (e.g., hydrogen gas) included in the anode exhaust gas is burnt to generate steam as described above. The high-temperature gas that has undergone combustion by the exhaust-gas combustor 24 (hereinafter, also referred to as the "combustion gas") is sent out from the upper end of the exhaust-gas combustor 24 and guided to the combustion gas passages 242. To facilitate understanding of the drawing, only one of the combustion gas passages 242 is illustrated and the other combustion gas passages 242 are not shown in FIG. 5. The combustion gas flows upward within each combustion gas passage 242, which passes through the interior of the reformer 22, and then flows downward.

In the reformer 22, heat is applied from the high-temperature combustion gas flowing in each combustion gas passage 242 (i.e., gas flowing in the reformer catalyst 223 and the reformer 22) to the surroundings. This improves the efficiency of the reforming of the raw fuel by the reformer 22. The combustion gas sent out of the combustion gas passages 242 (i.e., combustion gas that has passed through the reformer 22) is guided to the outside of the pressure vessel 25 through a pipe 285 and discharged to the outside of the housing 21.

The combustion of the gas such as unused fuel gas in the exhaust-gas combustor 24 is equivalent to an exothermic reaction as described above. The heat generated in the exhaust-gas combustor 24 is applied to the reformer 22, which faces the exhaust-gas combustor 24 in the radial direction, and is used for the reforming of the raw fuel, i.e., an endothermic reaction. In the example illustrated in FIG. 5, the portion of the reformer 22 that is located close to the supply port 225 and absorbs a large amount of heat (e.g., the lower half portion of the first reforming passage 221) faces the portion of the exhaust-gas combustor 24 provided with the combustion catalyst 241, in the radial direction. This improves the efficiency of the application of the heat from the exhaust-gas combustor 24 to the reformer 22. As a result, it is possible to further improve the efficiency of the reforming of the raw fuel by the reformer 22.

The combustion gas discharged from the pressure vessel 25 through the pipe 285 is guided through a combustion gas pipe 292 outside the housing 21 to the heat exchanger 71 illustrated in FIG. 1. The heat exchanger 71 is arranged in the raw-fuel supply pipe 291 as described above. The heat exchanger 71 uses the high-temperature combustion gas flowing through the combustion gas pipe 292 to preheat the raw fuel and the steam, which are supplied respectively from the raw-fuel supply source 41 and the steam generator 32 to the reformer 22. That is, the heat exchanger 71 serves as a raw-fuel preheater that preheats the raw fuel.

The combustion gas that has passed through the heat exchanger 71 is guided through the combustion gas pipe 292 to the aforementioned condenser 33. The condenser 33 condenses the steam included in the combustion gas into water. The water generated by the condenser 33 is sent to the water storage 311 of the water supplier 31 through a water supply pipe 331, and the water in the water storage 311 is supplied to the steam generator 32 by the pump 312. The combustion gas that has passed through the condenser 33 is discharged through a combustion gas pipe 294 to the outside of the system (i.e., the outside of the fuel cell system 1).

In the fuel cell system 1, the heat generated by the cell stacks 23 and the exhaust-gas combustor 24 is applied to the reformer 22 and used in the reforming of the raw fuel as described above. The combustion gas is used to preheat the raw fuel and the steam, which are supplied to the reformer 22. The use of such heat allows the fuel cell system 1 to conduct a steady operation while generating heat that is required in the system during the steady operation. In other words, the fuel cell system 1 is capable of thermally self-sustaining operation during the steady operation.

The use of the steam included in the combustion gas in the reforming of steam by the reformer 22 allows the fuel cell system 1 to conduct a steady operation while generating steam required in the system during the steady operation. In other words, the fuel cell system 1 is capable of water self-sustaining operation during the steady operation.

As described above, the fuel cell system 1 includes the reformer 22, the cell stacks 23, and the exhaust-gas combustor 24. The reformer 22 has a tubular shape extending in the axial direction and reforms raw fuel into fuel gas. The cell stacks 23 generate electric power from the fuel gas and the oxidant gas. The cell stacks 23 are arranged radially outward of the reformer 22 in the circumferential direction to face the reformer 22 in the radial direction. The exhaust-gas combustor 24 burns the unused fuel gas included in the exhaust gas from the cell stacks 23. The exhaust-gas combustor 24 is arranged radially inward of the reformer 22 to face the reformer 22 in the radial direction. Each of the cell stacks 23 includes a plurality of flat plate type cells stacked in the radial direction.

In the fuel cell system 1, heat exchange between the reformer 22 and each of the cell stacks 23 and the exhaust-gas combustor 24 is conducted efficiently by sandwiching the reformer 22, which causes an endothermic reaction, between the cell stacks 23 and the exhaust-gas combustor 24, which cause an exothermic reaction, in the radial direction. As a result, it is possible to improve the efficiency of the generation of electric power by the fuel cell system 1. Moreover, the downsizing of the fuel cell system 1 in the direction perpendicular to the axial direction is achieved by arranging a plurality of cells to be stacked in the radial direction. In other words, the downsizing of the fuel cell system 1 in the radial direction permits the downsizing of the footprint of the fuel cell system. Furthermore, the downsizing of the fuel cell system 1 allows a reduction in heat dissipation from the fuel cell system 1 to the surroundings and accordingly results in a further improvement in the efficiency of the generation of electric power by the fuel cell system 1.

Since, as described above, the fuel cell system 1 permits efficient heat exchange between the reformer 22 and each of the cell stacks 23 and the exhaust-gas combustor 24, the structure of the fuel cell system 1 is in particular suitable for use in a fuel cell system that includes solid oxide fuel cells serving as the cell stacks 23 and that generates electric power at a high temperature.

As described above, it is preferable that the exhaust-gas combustor 24 faces, in the radial direction, the portion of the reformer 22 that is located close to the supply port 225 to which the raw fuel is supplied. By in this way arranging the exhaust-gas combustor 24 to face the portion of the reformer 22 in which an endothermic reaction occurs strongly, it is possible to improve the efficiency of heat exchange between the reformer 22 and the exhaust-gas combustor 24.

As described above, it is preferable that the cell stacks 23 include a plurality of rows of cell stack groups 231 arranged in three or more rows in the axial direction. It is also preferable that a cell stack group in at least one of the rows of cell stack groups 231, excluding the rows of cell stack groups 231 at both ends in the axial direction, faces the portion of the reformer 22 in the radial direction, the portion being located close to the supply port 225 to which the raw fuel is supplied. By in this way arranging a relatively high-temperature cell stack group 231 among the plurality of rows of cell stack groups 231 to face the portion of the reformer 22 in which an endothermic reaction occurs strongly, it is possible to improve the efficiency of heat exchange between the reformer 22 and the cell stacks 23. Moreover, since the uniformity in the temperatures of the cell stack groups 231 is improved as described above, the uniformity in the lives of the cell stacks 23 is also improved.

As described above, it is preferable that the fuel cell system 1 further includes the combustion gas passages 242 that pass the combustion gas discharged from the exhaust-gas combustor 24 through the interior of the reformer 22. Accordingly, the heat of the combustion gas flowing through the combustion gas passages 242 is efficiently applied to the reformer 22. As a result, it is possible to improve the efficiency of the reforming of the raw fuel by the reformer 22.

As described above, it is preferable that the combustion gas passages 242 have a U shape extending in the axial direction within the reformer 22. This increases the lengths of the combustion gas passages 242 within the reformer 22 and further improves the efficiency of the application of the heat of the combustion gas to the reformer 22. The use of the U-shaped pipe lines also eases thermal stress occurring at both ends of the combustion gas passages 242. As a result, it is possible to further improve the efficiency of the reforming of the raw fuel by the reformer 22 with a simple structure.

As described above, it is preferable that the flow direction of the combustion gas in the combustion gas passages 242 is opposite to the flow direction of the gas in the reformer 22. In other words, it is preferable that the flow of the combustion gas in the combustion gas passage 242 and the flow of the gas in the reformer 22 form opposed flows. In the fuel cell system 1, the temperature of the gas on the upstream side of the reformer 22 is lower than the temperature of the gas on the downstream side. On the other hand, the temperature of the combustion gas on the upstream side of each combustion gas passage 242 (i.e., on the downstream side of the reformer 22) is higher than the temperature of the combustion gas on the downstream side of the combustion gas passage 242 (i.e., on the upstream side of the reformer 22). Therefore, by directing the flow direction of the combustion gas and the flow direction of gas in the reformer 22 in opposite directions, it is possible to bring the difference in temperature between the reformer 22 and the combustion gas on the upstream side of the reformer 22 closer to the difference in temperature between the reformer 22 and the combustion gas on the downstream side of the reformer 22. In other words, the difference in temperature between the reformer 22 and the combustion gas is made approximately constant along, for example, the entire length of the reformer 22. This further improves the efficiency of the application of the heat of the combustion gas to the reformer 22. As a result, it is possible to further improve the efficiency of the reforming of the raw fuel by the reformer 22.

As described above, it is preferable that the fuel cell system 1 further includes the pressure vessel 25 that houses the reformer 22, the cell stacks 23, and the exhaust-gas combustor 24 in its enclosed internal space 250. It is also preferable that each of the cell stacks 23 has a cathode exhaust port through which the cathode exhaust gas is discharged to the internal space 250 of the pressure vessel 25. This reduces the difference between the internal pressure of the cell stacks 23 and the pressure around the cell stacks 23 in the pressure vessel 25. As a result, it is possible to suppress leakage of gas from the cell stacks 23. It is also possible to suppress leakage of gas from joints such as the joints between the cell stacks 23 and the pipes and the joints between the pipes in the pressure vessel 25.

Figure 6:
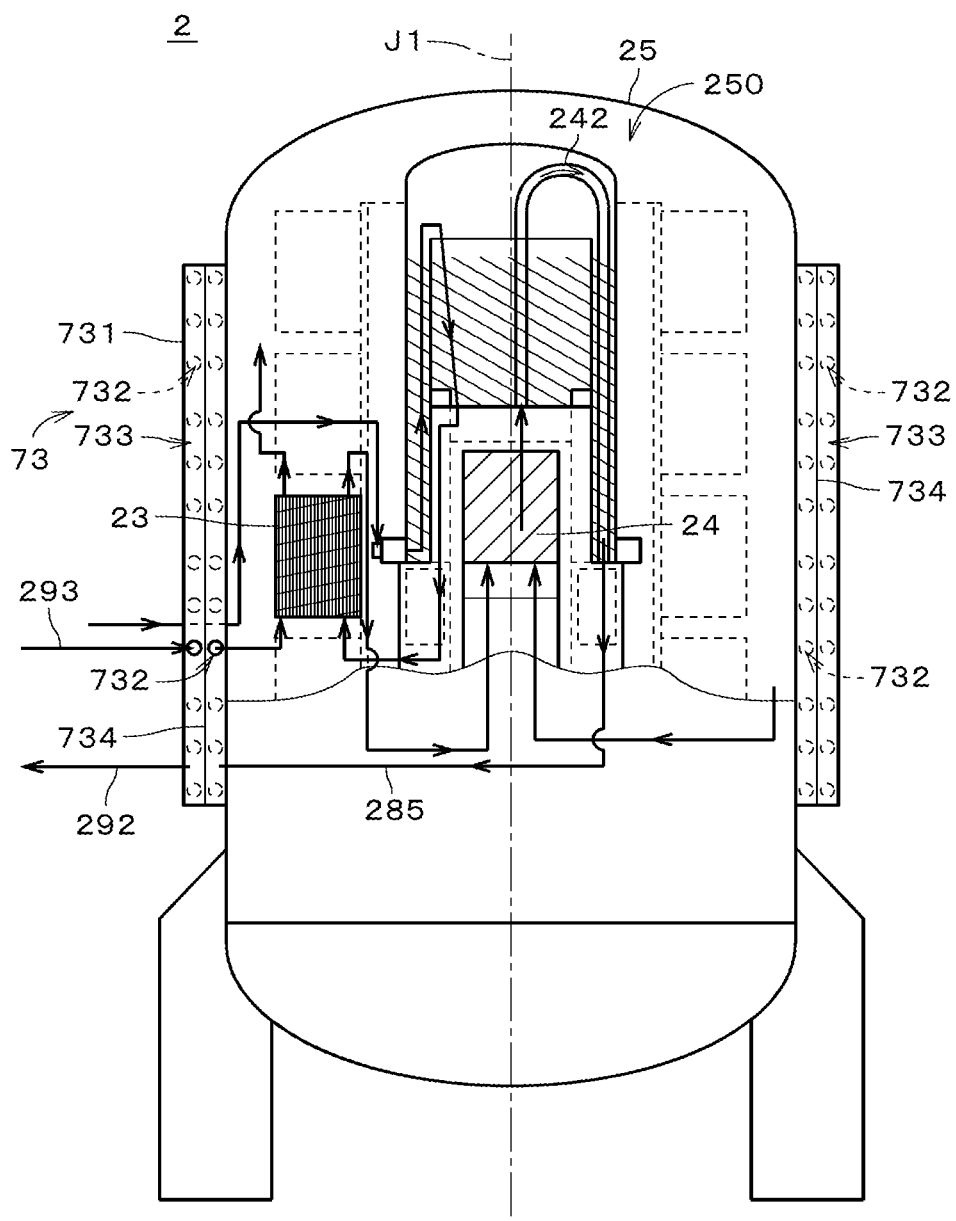
FIG. 6 is a longitudinal sectional view of yet another hot module.
Figure 7:
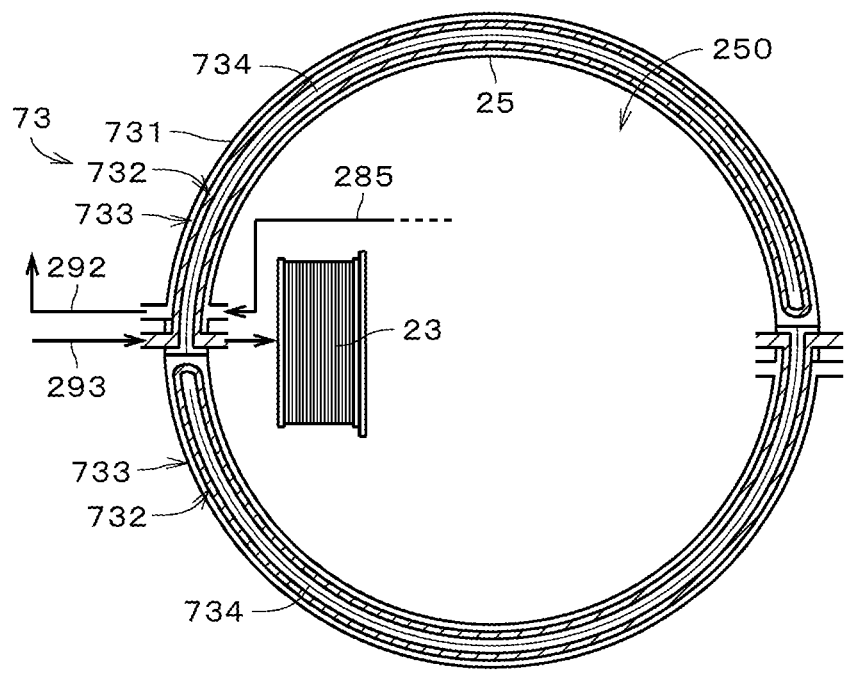
FIG. 7 is a cross-sectional view of the hot module.

The fuel cell system 1 may further include an oxidant gas preheater 73 arranged around the pressure vessel 25 as illustrated in FIGS. 6 and 7. For example, the oxidant gas preheater 73 may be a hollow member of an approximately cylindrical shape having the central axis J1 as its center and is attached in contact to the outer surface of the pressure vessel 25 to face the pressure vessel 25 in the radial direction. For the sake of convenience, part of the configuration of the pressure vessel 25 is not shown in FIG. 7.

The oxidant gas preheater 73 includes a preheater body 731, an oxidant gas passage 732, and an exhaust gas passage 733. To facilitate understanding of the drawing, the oxidant gas passage 732 is hatched in FIG. 7. The preheater body 731 is a casing of the oxidant gas preheater 73 and has an approximately cylindrical shape having the central axis J1 as its center as described above. The interior of the preheater body 731 is sectioned into an inner circumferential portion and an outer circumferential portion by an approximately arc-shaped partition wall 734. In the preheater body 731, the inner peripheral portion and the outer peripheral portion communicate in part with each other in the circumferential direction. The interior of the preheater body 731 is also divided into approximately halves in the circumferential direction by a partition wall.

The oxidant gas passage 732 is a pipe line arranged inside the preheater body 731. The oxidant gas passage 732 is provided in approximately a half area of the preheater body 731 in the circumferential direction. Specifically, the oxidant gas passage 732 extends over approximately 180 degrees in the outer peripheral portion of the preheater body 731 and is folded back to the inner circumferential portion of the preheater body 731 to extend over approximately 180 degrees in the inner circumferential portion. One end of the oxidant gas passage 732 is connected to the oxidant-gas supply pipe 293 on the outer surface of the preheater body 731. The other end of the oxidant gas passage 732 is connected to the positive electrodes of the cell stacks 23 through the inner surface of the preheater body 731.

The oxidant gas passage 732 passes the oxidant gas that is being supplied from the blower 51 (see FIG. 1) to the cell stacks 23 (i.e., the oxidant gas before supplied to the cell stacks 23). The oxidant gas flows from the outer peripheral portion of the oxidant gas passage 732 to the inner peripheral portion and guided from the oxidant gas preheater 73 to the inside of the pressure vessel 25. Since the oxidant gas passage 732 is arranged around the pressure vessel 25 to face the pressure vessel 25, the oxidant gas flowing in the oxidant gas passage 732 is preheated by the heat dissipated from the pressure vessel 25 to the outside.

In the fuel cell system 1, a plurality of oxidant gas passages 732 that correspond respectively to the plurality of cell stacks 23 are arranged inside the preheater body 731. In FIG. 6, one of the oxidant gas passages 732 is illustrated by solid lines, and the other oxidant gas passages 732 are illustrated by broken lines.

The exhaust gas passage 733 is an area of the internal space of the preheater body 731 other than the oxidant gas passages 732. In other words, the exhaust gas passage 733 is arranged adjacent to the oxidant gas passages 732 in the preheater body 731. Like the oxidant gas passages 732, the exhaust gas passage 733 also extends over approximately 180 degrees in the outer circumferential portion of the preheater body 731 and is folded back to the inner circumferential portion of the preheater body 731 to extend over approximately 180 degrees in the inner circumferential portion. The exhaust gas passage 733 is connected to the pipe 285 on the inner surface of the preheater body 731 and connected to the exhaust-gas combustor 24 through the combustion gas passage 242. The exhaust gas passage 733 passes the high-temperature combustion gas discharged from the exhaust-gas combustor 24 through the combustion gas passage 242 to the outside of the pressure vessel 25. The combustion gas flows from the inner circumferential portion of the exhaust gas passage 733 to the outer circumferential portion and is discharged from the oxidant gas preheater 73 to the outside to flow through the combustion gas pipe 292. The heat of the combustion gas is applied to the oxidant gas in the oxidant gas passages 732 passing through the exhaust gas passage 733. Accordingly, the oxidant gas supplied from the blower 51 to the cell stacks 23 is preheated.

As described above, in the example illustrated in FIGS. 6 and 7, the fuel cell system 1 further includes the pressure vessel 25 and the oxidant gas passages 732, in addition to the reformer 22, the cell stacks 23, and the exhaust-gas combustor 24, which are described above. The pressure vessel 25 houses the reformer 22, the cell stacks 23, and the exhaust-gas combustor 24 in its enclosed internal space 250. The oxidant gas passages 732 are arranged around the pressure vessel 25 to face the pressure vessel 25. The oxidant gas passages 732 pass the oxidant gas supplied to the cell stacks 23. Accordingly, the oxidant gas is preheated by the heat that is dissipated from the pressure vessel 25 to the outside and applied to the oxidant gas. As a result, it is possible to improve the efficiency of the generation of electric power by the fuel cell system 1.

As described above, it is preferable that the fuel cell system 1 further includes the exhaust gas passage 733 that is arranged adjacent to the oxidant gas passages 732 and that passes the combustion gas discharged from the exhaust-gas combustor 24. Accordingly, the heat of the combustion gas is also applied to the oxidant gas and preheats the oxidant gas. As a result, it is possible to further improve the efficiency of the generation of electric power by the fuel cell system 1.

As described above, it is preferable that the flow direction of the oxidant gas in the oxidant gas passages 732 is opposite to the flow direction of the gas in the exhaust gas passage 733. In other words, it is preferable that the flow of the oxidant gas in the oxidant gas passages 732 and the flow of the combustion gas in the exhaust gas passage 733 form opposed flows. In the fuel cell system 1, the temperature of the oxidant gas on the upstream side of the oxidant gas passage 732 is lower than the temperature of the oxidant gas on the downstream side. On the other hand, the temperature of the combustion gas on the upstream side of the exhaust gas passage 733 (i.e., on the downstream side of the oxidant gas passages 732) is higher than the temperature of the combustion gas on the downstream side of the exhaust gas passage 733 (i.e., on the upstream side of the oxidant gas passages 732). Therefore, by directing the flow direction of the oxidant gas and the flow direction of the combustion gas in opposite directions, it is possible to bring the difference in temperature between the oxidant gas and the combustion gas on the upstream side of the oxidant gas passages 732 closer to the difference in temperature between the oxidant gas and the combustion gas on the downstream side of the oxidant gas passages 732. In other words, the difference in temperature between the oxidant gas and the combustion gas is made approximately constant along, for example, the entire lengths of the oxidant gas passages 732. This further improves the efficiency of the application of the heat of the combustion gas to the oxidant gas and further improves the efficiency of the preheating of the oxidant gas.

In the oxidant gas preheater 73, the gas flowing in the exhaust gas passage 733 does not necessarily have to be the combustion gas discharged from the exhaust-gas combustor 24, and may be the cathode exhaust gas discharged from the pressure vessel 25 to the outside. Even in this case, the heat of the cathode exhaust gas is applied to the oxidant gas and preheats the oxidant gas in approximately the same manner as described above. As a result, it is possible to further improve the efficiency of the generation of electric power by the fuel cell system 1. The cathode exhaust gas that has passed through the exhaust gas passage 733 is returned to the inside of the pressure vessel 25 and supplied to the exhaust-gas combustor 24. Since, as described above, the cathode exhaust gas has dropped in temperature due to the heat exchange with the oxidant gas in the oxidant gas preheater 73, it is possible to, when the exhaust-gas combustor 24 has an upper-limit temperature, favorably prevent or suppress the temperature of the cathode exhaust gas from exceeding the upper-limit temperature.

The fuel cell system 1 described above may be modified in various ways.

For example, in the oxidant gas preheater 73, the flow direction of the oxidant gas in the oxidant gas passages 732 and the flow direction of the gas in the exhaust gas passage 733 do not necessarily have to be opposite directions, and may be the same direction. The exhaust gas passage 733 may be a pipe line arranged adjacent to the oxidant gas passages 732. Note that the preheater body 731 and the exhaust gas passage 733 may be omitted from the oxidant gas preheater 73.

The cathode exhaust gas from the cell stacks 23 does not necessarily have to be discharged to the internal space 250 of the pressure vessel 25, and may be discharged to the outside of the pressure vessel 25 and the housing 21 through piping such as the pipes connected to the cell stacks 23. Note that the pressure vessel 25 may be omitted from the fuel cell system 1.

The flow direction of the combustion gas in the combustion gas passage 242 and the flow direction of the gas in the reformer 22 do not necessarily have to be opposite directions, and may be the same direction, for example. The combustion gas passage 242 does not necessarily have to have a U shape extending in the axial direction, and the combustion gas passage 242 may have any of various shapes (e.g., a linear shape or a helicoid shape). The combustion gas passage 242 does not necessarily have to pass through the interior of the reformer 22, and may pass by the reformer 22. Even in this case, the heat of the combustion gas flowing in the combustion gas passage 242 is applied to the reformer 22. Note that the combustion gas passage 242 may be omitted.

The portion of the reformer 22 that is located close to the supply port 225 does not necessarily have to face the cell stack groups 231 other than those at both ends in the axial direction among a plurality of rows of cell stack groups 231, and may face the cell stack groups 231 at both ends in the axial direction.

The exhaust-gas combustor 24 does not necessarily have to be a catalyst combustor, and may be any of various types of combustors (e.g., a burner). The exhaust-gas combustor 24 does not necessarily have to face the portion of the reformer 22 that is located close to the supply port 225, and may face any of the other portions of the reformer 22 in the radial direction.

In the fuel cell system 1, the steam included in the combustion gas is extracted in the form of water by the condenser 33 and supplied to the steam generator 32 via the water supplier 31, but part of the combustion gas including the steam may be supplied in the form of gas as-is to the reformer 22. Alternatively, the anode exhaust gas from the cell stacks 23 may be once guided to the outside of the pressure vessel 25 before guided to the exhaust-gas combustor 24 and pass through constituent elements such as the heat exchanger 71 and the condenser 33 before guided to the exhaust-gas combustor 24.

The fuel cell system 1 does not necessarily have to perform a thermally self-sustaining operation during the steady operation and may continuously perform heating in the housing 21, using a burner or any other device. The fuel cell system 1 also does not necessarily have to perform a water self-sustaining operation during the steady operation, and for example, water that is supplied to the water storage 311 from outside the system may be continuously supplied to the steam generator 32, in addition to the water sent from the condenser 33 to the water storage 311.

The cell stacks 23 described above do not necessarily have to be solid oxide fuel cells, and may be any of other types of fuel cells.

The configurations of the above-described preferred embodiments and variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention.

REFERENCE SIGNS LIST

1 Fuel cell system
22 Reformer
23 Cell stack
24 Exhaust gas combustor
25 Pressure vessel
225 Supply port
231 Cell stack group
242 Combustion gas passage
250 Internal space (of pressure vessel)
732 Oxidant gas passage
733 Exhaust gas passage
J1 Central axis

The invention claimed is:

1. A fuel cell system comprising:
a reformer that has a tubular shape extending in an axial direction and reforms raw fuel into fuel gas;
a plurality of cell stacks that are arranged radially outward of said reformer in a circumferential direction to face said reformer in a radial direction and generate electric power from said fuel gas and oxidant gas; and
an exhaust-gas combustor that is arranged radially inward of said reformer to face said reformer in the radial direction and burns said fuel gas that is not used and included in exhaust gas from said plurality of cell stacks,
wherein each of said plurality of cell stacks includes a plurality of flat plate type cells stacked in the radial direction.

2. The fuel cell system according to claim 1, wherein said exhaust-gas combustor faces a portion of said reformer in the radial direction, the portion being located close to a supply port from which said raw fuel is supplied.

3. The fuel cell system according to claim 1, wherein said plurality of cell stacks include a plurality of rows of cell stack groups arranged in three or more rows in said axial direction, and
a cell stack group in at least one row of said plurality of rows of cell stack groups, excluding cell stack groups at both ends in said axial direction, faces a portion of said reformer in the radial direction, the portion being located close to a supply port from which said raw fuel is supplied.

4. The fuel cell system according to claim 1, further comprising:
a combustion gas passage that passes combustion gas discharged from said exhaust-gas combustor through an interior of said reformer.

5. The fuel cell system according to claim 4, wherein said combustion gas passage has a U shape extending in said axial direction in said reformer.

6. The fuel cell system according to claim 4, wherein a flow direction of said combustion gas in said combustion gas passage is opposite to a flow direction of gas in said reformer.

7. The fuel cell system according to claim 1, further comprising:
a pressure vessel that houses said reformer, said plurality of cell stacks, and said exhaust-gas combustor in an enclosed internal space,
wherein each of said plurality of cell stacks has a cathode exhaust port from which cathode exhaust gas is discharged to said internal space of said pressure vessel.

8. The fuel cell system according to claim 1, further comprising:
a pressure vessel that houses said reformer, said plurality of cell stacks, and said exhaust-gas combustor in an enclosed internal space; and
an oxidant gas passage that is arranged around said pressure vessel to face said pressure vessel and passes said oxidant gas supplied to said plurality of cell stacks.

9. The fuel cell system according to claim 8, further comprising:
an exhaust gas passage that is arranged adjacent to said oxidant gas passage and passes cathode exhaust gas discharged from said pressure vessel or combustion gas discharged from said exhaust-gas combustor.

10. The fuel cell system according to claim 1, wherein each of said plurality of cell stacks is a solid oxide fuel cell.

* * * * *